(12) United States Patent
Yoneshige et al.

(10) Patent No.: US 11,401,631 B2
(45) Date of Patent: Aug. 2, 2022

(54) IMPACT RESISTANT, WRAPPABLE MULTILAYERED WOVEN SLEEVE AND METHOD OF CONSTRUCTION THEREOF

(71) Applicant: FEDERAL-MOGUL POWERTRAIN LLC, Southfield, MI (US)

(72) Inventors: Yuki Yoneshige, Tokyo (JP); Xiaodan Qiu, Downingtown, PA (US); Tianqi Gao, Exton, PA (US); Danny Winters, Gordonville, PA (US); Ritesh Mehbubani, Rogersford, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 17/081,874

(22) Filed: Oct. 27, 2020

(65) Prior Publication Data

US 2021/0123168 A1    Apr. 29, 2021

Related U.S. Application Data

(60) Provisional application No. 62/926,998, filed on Oct. 28, 2019.

(51) Int. Cl.
  *D03D 3/02*     (2006.01)
  *D03D 1/00*     (2006.01)
  *D03D 11/00*    (2006.01)

(52) U.S. Cl.
  CPC .......... *D03D 1/0041* (2013.01); *D03D 11/00* (2013.01); *D10B 2331/021* (2013.01); *D10B 2331/04* (2013.01)

(58) Field of Classification Search
  CPC ...... D03D 1/0041; D03D 11/00; D03D 15/43; D03D 13/008; D03D 13/004;
  (Continued)

(56) References Cited

U.S. PATENT DOCUMENTS 4,741,087 A * 5/1988 Plummer, Jr. ...... B29C 61/0658
  138/123
5,077,107 A * 12/1991 Kaneda ..................... B32B 7/12
  428/36.1

(Continued)

OTHER PUBLICATIONS

International Search Report, dated Jan. 13, 2021 (PCT/US2020/057681).

*Primary Examiner* — Robert H Muromoto, Jr.
(74) *Attorney, Agent, or Firm* — Robert L. Stearns; Dickinson Wright, PLLC (57) ABSTRACT

A wrappable, woven sleeve includes a wall having opposite edges extending lengthwise between opposite ends, with the opposite edges being wrappable into overlapping relation to bound a central cavity. The wall has a plurality of layers extending from one edge to the opposite edge and from one end to the opposite end in overlying relation with one another. Each of the layers include warp yarns and fill yarns woven together. The wrapped wall has a radially outermost layer and a radially innermost layer. The radially outermost layer has at least one of a first tightness and/or first width and the radially innermost layer has at least one of a second tightness and/or second width, with the first tightness and first width being greater than the second tightness and second width.

18 Claims, 4 Drawing Sheets

(58) Field of Classification Search
CPC ............. D03D 1/0043; D10B 2331/04; D10B 2331/021; B32B 2571/00; B32B 1/08; B32B 5/024; B32B 5/26; B60R 16/0215
See application file for complete search history.

(56) References Cited

U.S. PATENT DOCUMENTS

| | | | | |
|---|---|---|---|---|
| 5,202,186 | A * | 4/1993 | Williamson | B32B 5/26 174/11 OF |
| 5,681,640 | A * | 10/1997 | Kiser | B32B 3/28 428/181 |
| 7,078,615 | B2 * | 7/2006 | Gladfelter | F16L 7/00 174/36 |
| 7,235,737 | B2 * | 6/2007 | Rodrigues | D04C 1/02 174/36 |
| 7,410,550 | B2 * | 8/2008 | Sherwin | F16L 59/021 156/190 |
| 8,455,080 | B2 * | 6/2013 | Baer | B32B 5/022 428/77 |
| 8,663,766 | B2 * | 3/2014 | Sellis | B32B 27/36 428/36.1 |
| 8,747,582 | B2 * | 6/2014 | Malloy | D06B 1/10 156/56 |
| 8,759,681 | B2 * | 6/2014 | Doi | C09J 7/29 174/117 A |
| 8,875,746 | B2 * | 11/2014 | Harris | D03D 15/49 139/384 R |
| 9,028,937 | B2 * | 5/2015 | Harris | B32B 3/10 428/36.1 |
| 9,336,924 | B2 * | 5/2016 | Malloy | B60R 16/0215 |
| 9,362,725 | B2 * | 6/2016 | Morris | D04B 21/16 |
| 9,457,739 | B2 * | 10/2016 | Yamaguchi | B60R 16/0215 |
| 9,719,197 | B2 * | 8/2017 | Tsuchikura | B32B 5/26 |
| 10,056,171 | B2 * | 8/2018 | Manabe | B32B 1/08 |
| 10,196,766 | B2 * | 2/2019 | Woodruff | B32B 5/024 |
| 10,276,278 | B2 * | 4/2019 | Kawaguchi | H01B 7/0045 |
| 10,315,379 | B2 * | 6/2019 | Woodruff | B32B 37/144 |
| 10,357,933 | B2 * | 7/2019 | Malloy | D03D 15/267 |
| 10,393,307 | B2 * | 8/2019 | Laurent | D03D 1/0043 |
| 10,542,645 | B2 * | 1/2020 | Simoens-Seghers | H01B 13/0036 |
| 10,883,204 | B2 * | 1/2021 | Shimizu | D06M 15/507 |
| 10,993,355 | B2 * | 4/2021 | Deltor | H01R 13/6592 |
| 2004/0084203 | A1 * | 5/2004 | Gladfelter | G02B 6/4463 174/93 |
| 2005/0126651 | A1 * | 6/2005 | Sherwin | F16L 59/021 138/127 |
| 2005/0217747 | A1 * | 10/2005 | Buriak | C08L 23/0815 138/140 |
| 2006/0054346 | A1 * | 3/2006 | Gladfelter | G02B 6/4459 174/74 A |
| 2006/0185872 | A1 * | 8/2006 | Rodrigues | D03D 1/0043 174/36 |
| 2007/0154684 | A1 * | 7/2007 | Baer | B32B 5/024 428/190 |
| 2008/0124976 | A1 * | 5/2008 | Rodrigues | D03D 1/0043 439/607.41 |
| 2008/0135119 | A1 * | 6/2008 | Tonooka | D03D 1/0043 138/110 |
| 2009/0226653 | A1 * | 9/2009 | Harris | B32B 5/12 428/36.1 |
| 2010/0084179 | A1 * | 4/2010 | Harris | D03D 1/0041 174/350 |
| 2010/0089515 | A1 * | 4/2010 | Malloy | B60R 16/0215 156/56 |
| 2010/0122835 | A1 * | 5/2010 | Doi | C09J 7/29 174/135 |
| 2010/0212952 | A1 * | 8/2010 | Abdelmoula | H01B 1/22 174/390 |
| 2011/0275268 | A1 * | 11/2011 | Harris | H02G 3/0481 442/319 |
| 2013/0040081 | A1 * | 2/2013 | Yoshimura | B60R 16/0215 428/34.1 |
| 2013/0105215 | A1 * | 5/2013 | Morris | H05K 9/0098 174/394 |
| 2014/0090739 | A1 * | 4/2014 | Harris | H02G 3/0481 139/35 |
| 2014/0246109 | A1 * | 9/2014 | Walton | B32B 27/12 138/123 |
| 2014/0262478 | A1 * | 9/2014 | Harris | H05K 9/009 174/393 |
| 2015/0152983 | A1 * | 6/2015 | Kalman | B32B 15/043 138/124 |
| 2015/0314551 | A1 * | 11/2015 | Chen | B32B 5/24 428/35.2 |
| 2016/0016376 | A1 * | 1/2016 | Woodruff | B32B 15/14 428/190 |
| 2016/0155537 | A1 * | 6/2016 | Manabe | B32B 1/08 174/107 |
| 2016/0309626 | A1 * | 10/2016 | Simoens-Seghers | D03D 1/0058 |
| 2017/0036412 | A1 * | 2/2017 | Malloy | B60R 16/0207 |
| 2017/0121868 | A1 * | 5/2017 | Zhang | D04C 1/06 |
| 2018/0023222 | A1 * | 1/2018 | Zhang | D06M 15/647 66/170 |
| 2018/0062364 | A1 * | 3/2018 | Qiu | D03D 15/00 |
| 2018/0119869 | A1 * | 5/2018 | Laurent | H02G 3/0481 |
| 2019/0291383 | A1 * | 9/2019 | Woodruff | B32B 7/12 |
| 2019/0375181 | A1 * | 12/2019 | Malloy | H02G 3/0412 |
| 2020/0154616 | A1 * | 5/2020 | Simoens-Seghers | H05K 9/0043 |
| 2021/0078284 | A1 * | 3/2021 | Martin | B32B 5/08 |
| 2021/0123168 | A1 * | 4/2021 | Yoneshige | B32B 5/26 |

* cited by examiner

FIG. 5B

IMPACT RESISTANT, WRAPPABLE MULTILAYERED WOVEN SLEEVE AND METHOD OF CONSTRUCTION THEREOF

CROSS-REFERENCE TO RELATED APPLICATION

This application claims the benefit of U.S. Provisional Application Ser. No. 62/926,998, filed Oct. 28, 2019, which is incorporated herein by reference in its entirety.

BACKGROUND OF THE INVENTION

1. Technical Field

This invention relates generally to textile sleeves for protecting elongate members, and more particularly to impact resistant, wrappable multilayered woven tubular sleeves.

2. Related Art

It is known to contain elongate members, such as wires, wire harnesses, cables and conduits of various types in woven sleeves to provide protection to the elongate members against impact and abrasion, fluid and thermal affects. In applications where high impact resistance is needed to prevent damage to the sleeve and the contents therein, wrappable woven sleeves having multiple layers are known. Each of the layers of the multilayered wall are typically formed having the same width and yarn density per unit area, and thus, upon wrapping the wall of the sleeve to bring opposite edges into overlapping relation with one another, thereby encircling the elongate being protected therein, wrinkles are typically formed in the innermost layers. Wrinkles not only cause the sleeve wall to bulge and appear unsightly and non-uniform in appearance, by they can also press and rub on the elongate member being protected, which ultimately can prove damaging and provide non-uniform protection to the elongate member.

Accordingly, what is needed is a wrappable multilayered woven sleeve that provides enhanced uniform protection to an elongate member contained therein, particularly against impact, abrasion and contamination, while having an aesthetically pleasing appearance, is economical in manufacture and assembly, and exhibits a long and useful life.

SUMMARY OF THE INVENTION

One aspect of the disclosure provide a wrappable, woven sleeve having a wall with opposite edges extending lengthwise between opposite ends, with the opposite edges being wrappable into overlapping relation to bound a central cavity. The wall has a plurality of layers extending from one edge to the opposite edge and from one end to the opposite end in overlying relation with one another. Each of the layers include warp yarns and fill yarns woven together. The wrapped wall has a radially outermost layer and a radially innermost layer. The radially outermost layer has at least one of a first tightness and/or first width and the radially innermost layer has at least one of a second tightness and/or second width, with the first tightness and first width being greater than the second tightness and second width. As a result of the differing tightnesses and/or widths of the radially outermost and radially innermost layers, the individual layers, and thus the wall, is formed being free of lengthwise extending buckled regions, also referred to as wrinkles, and thus, the elongate member contained within the sleeve receives optimal protection against damage and the wall remains aesthetically pleasing and free from bulges that may tend to inhibit the opposite edges from remaining closed in overlapping relation with one another.

In accordance with another aspect of the disclosure, a wrappable, multilayered woven sleeve for routing and protecting elongate members is provided. The sleeve includes an elongate wall having opposite edges extending lengthwise between opposite ends. The opposite edges are wrappable about a central axis into overlapping relation with one another to bound a central cavity. The wall has a plurality of layers extending in overlying relation with one another between the opposite ends. Each of the layers include warp yarns extending generally parallel to the central axis woven with fill yarns extending generally transversely to the warp yarns. Upon wrapping the opposite edges into overlapping relation with one another, one of the plurality of layers forms a radially outermost layer and one of the plurality of layers forms a radially innermost layer. The radially outermost layer has a first tightness and the radially innermost layer has a second tightness, with the first tightness being greater than the second tightness. As a result of the differing tightness, the individual layers of the wall are formed being free of wrinkles, and thus, the elongate member contained within the sleeve receives optimal protection against damage.

In accordance with another aspect of the invention, the radially outermost layer has a first width extending between the opposite edges and the radially innermost layer has a second width extending between the opposite edges, with the first width being greater than the second width, thereby preventing wrinkles from being formed in the innermost layer upon wrapping the wall about the elongate member to be protected.

In accordance with another aspect of the invention, the plurality of layers include intermediate layers sandwiched between the radially outermost layer and the radially innermost layer. The intermediate layers have respective widths decreasing in width relative to one another such that the widths decrease relative to one another progressively from the radially outermost layer to the radially innermost layer, thereby preventing wrinkles from being formed in the individual layers upon wrapping the wall about the elongate member to be protected.

In accordance with another aspect of the invention, the radially outermost layer has a first weave pattern having a first weave tightness and the radially innermost layer has a second weave pattern having a second weave tightness, with the first weave tightness being greater than the second weave tightness.

In accordance with another aspect of the invention, the first weave pattern is a plain weave and the second weave pattern is other than a plain weave pattern, such that the other weave patterns have a reduced weave tightness relative to the plain weave pattern.

In accordance with another aspect of the invention, the second weave pattern is one of a twill weave, satin weave, or basket weave.

In accordance with another aspect of the invention, the outermost layer is woven with yarn having a first diameter and/or first denier and the innermost layer is woven with yarn having a second diameter and/or second denier, with the first diameter and/or first denier being greater than the second diameter and/or second denier, thereby providing the outermost layer having a density that is greater than the innermost layer, and thus, preventing wrinkles from being formed in the innermost layer upon wrapping the wall about the elongate member to be protected.

In accordance with another aspect of the invention, a method of constructing a wrappable, multilayered woven sleeve is provided. The method includes weaving an elongate wall having opposite edges extending lengthwise between opposite ends, with the elongate wall being configured to be wrapped about a central axis to bring the opposite edges into overlapping relation with one another to bound a central cavity. Further, weaving the wall to include a plurality of layers extending in overlying relation with one another between the opposite edges and the opposite ends, with each of the layers including warp yarns extending generally parallel to the central axis woven with fill yarns extending generally transversely to the warp yarns, such that upon wrapping the opposite edges into overlapping relation with one another, one of the plurality of layers forms a radially outermost layer and one of the plurality of layers forms a radially innermost layer. Further, weaving the radially outermost layer having a first tightness and weaving the radially innermost layer having a second tightness, with the first tightness being greater than the second tightness.

In accordance with another aspect of the invention, the method can further include weaving the radially outermost layer having a first width extending between the opposite edges and weaving the radially innermost layer having a second width extending between the opposite edges, with the first width being greater than the second width.

In accordance with another aspect of the invention, the method can further include weaving the plurality of layers including intermediate layers sandwiched between the radially outermost layer and the radially inner most layer, and weaving the intermediate layers having respective widths decreasing in width relative to one another such that the widths decrease relative to one another progressively from the radially outermost layer to the radially innermost layer.

In accordance with another aspect of the invention, the method can further include weaving the radially outermost layer with a first weave pattern having a first weave tightness and weaving the radially innermost layer with a second weave pattern having a second weave tightness, with the first weave tightness being greater than the second weave tightness.

In accordance with another aspect of the invention, the method can further include weaving the first weave pattern as a plain weave and weaving the second weave pattern as other than a plain weave pattern.

In accordance with another aspect of the invention, the method can further include weaving the second weave pattern as one of a twill weave, satin weave, or basket weave.

In accordance with another aspect of the invention, the method can further include weaving the outermost layer with yarn having a first diameter and/or first denier and weaving the innermost layer with yarn having a second diameter and/or second denier, with the first diameter and/or first denier being greater than the second diameter and/or second denier.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
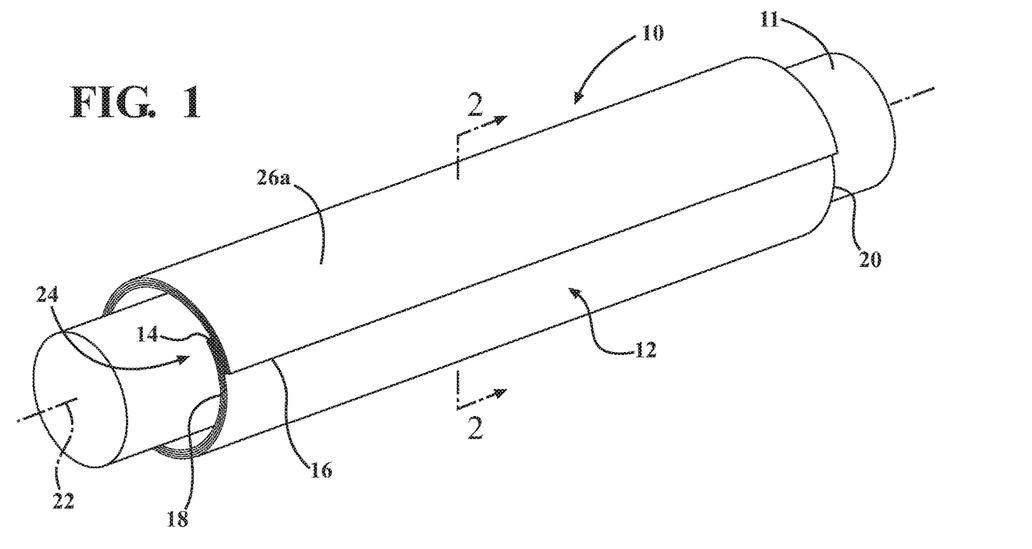
FIG. 1 is a schematic perspective view of a wrappable, multilayered, woven sleeve constructed in accordance with one aspect of the invention shown warppable about an elongate member to be protected.
Figure 2:
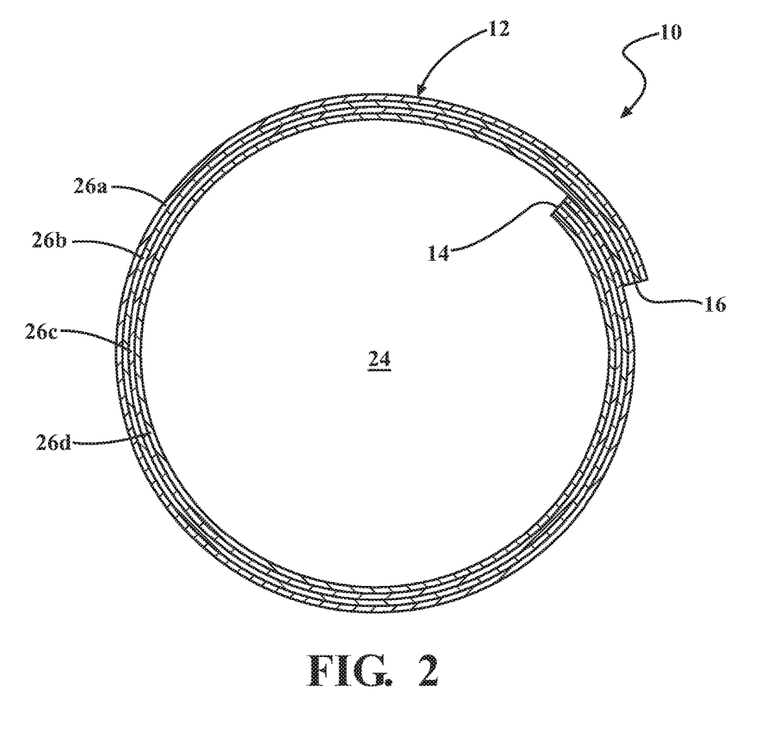
FIG. 2 is a cross-sectional view taken generally along the line 2-2 of FIG. 1 with the elongate member removed.
Figure 3:
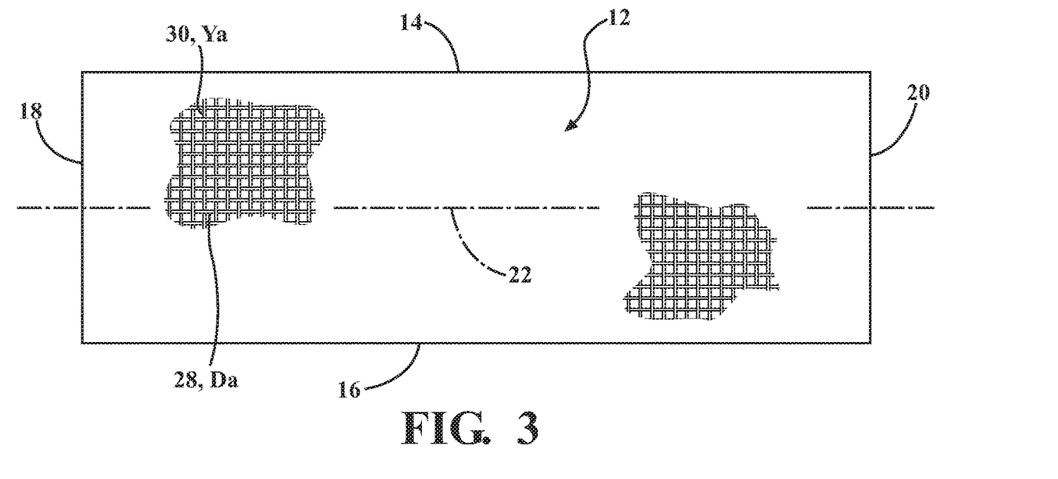
FIG. 3 is a schematic plan view of a wall of the sleeve of FIG. 1 shown in a flattened state prior to being wrapped.

Referring in more detail to the drawings, FIG. 1 schematically illustrates a flexible, wrappable, multilayered, woven sleeve, referred to hereafter as sleeve 10, constructed in accordance with one aspect of the invention having a wall 12 wrapped about an elongate member 11 to be protected, such as a wire harness, conduit, or the like. The wall 12 includes has opposite edges 14, 16 extending lengthwise between opposite ends 18, 20. The opposite edges 12, 14 are wrappable about a central axis 22 into overlapping relation with one another to bound a central cavity 24, through which the elongate member 11 extends and in which the elongate member 11 is protected against impact forces, such as may be experienced in a vehicle crash, abrasion, and ingress of contamination, by way of example and without limitation. The wall 12 has a plurality of layers, shown as four layers 26a, 26b, 26c, 26d, by way of example and without limitation, extending in overlying, abutting relation with one another between the opposite ends 18, 20. Each of the layers 26a, 26b, 26c, 26d, as best shown in FIG. 3, include warp yarns 28 extending generally parallel to the central axis 22 woven with fill yarns 30 extending generally transversely to the warp yarns 28. Upon wrapping the opposite edges 14, 16 into overlapping relation with one another, one of the plurality of layers forms a radially outermost layer 26a and one of the plurality of layers forms a radially innermost layer 26d. The radially outermost layer 26a has a first weave density, also referred to as first tightness D1 per unit area and the radially innermost layer 26d has a second weave density, also referred to as second tightness D2 per unit area, wherein the first tightness D1 is greater than the second tightness D2, which results in the wall 12, and all layers 26a, 26b, 26c, 26d thereof, being smooth and free from wrinkles upon wrapping the wall 12 into a tubular configuration. With the wall 12 being free from wrinkles, maximum protection can be provided to the elongate member 11 against impact forces and abrasion.

To facilitate maintaining the wall 12 in its wrapped state about the elongate member 11, at least some of the fill yarns 30 within one or more of the layers 26a, 26b, 26c, 26d can be provided as heat-settable fill yarns 30, such that a suitable heat treat process causes the wall 12 to be heat-set to remain biased in its wrapped state absent an externally applied force to the opposite edges 14, 16, such as can be used to insert the elongate member 11 into the cavity 24 during assembly and to remove the elongate member 11 from the cavity during service. With the innermost layer 26d having a reduced tightness relative to the outermost layer 26a, the innermost layer 26d can be heat-set to be smooth and free from wrinkles. The relatively reduced tightness of the innermost layer 26d allows the innermost layer 26d to shrink without causing wrinkles to be formed. The intermediate layers 26b, 26c sandwiched between the radially outermost layer 26a and the radially inner most layer 26d are woven such that the layers 26a, 26b, 26c, 26d have respective tightness D1, D2, D3, D4, also referred to as weave densities, that decreases relative to one another such that the tightness decreases progressively from the radially outermost layer 26a to the radially innermost layer 26d. Accordingly, D1>D2>D3>D4. As a result, upon heat-setting the wall 12, each of the layers 26a, 26b, 26c, 26d remains smooth and free from wrinkles.

Figure 4:
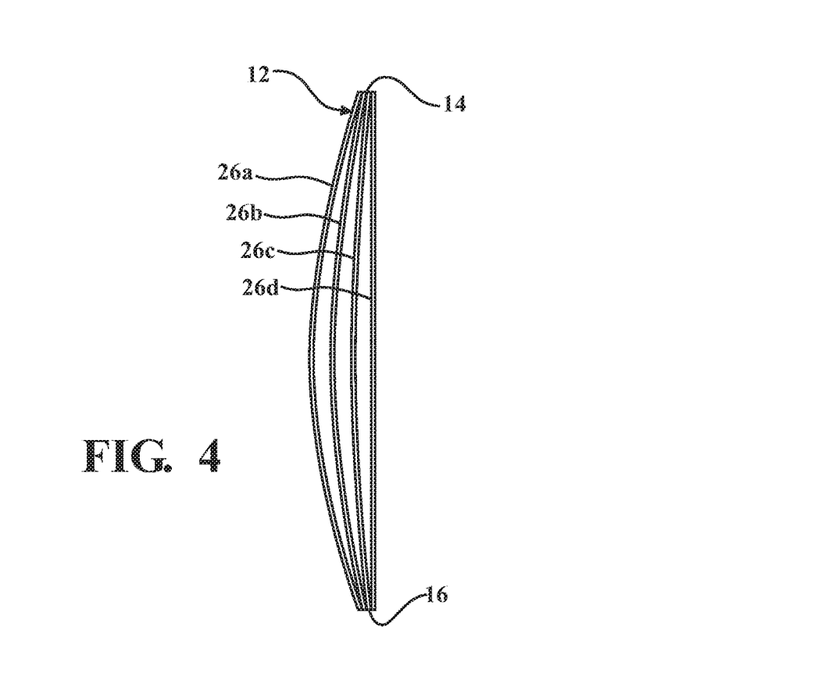
FIG. 4 is a schematic end view of the wall of FIG. 3 illustrating the relative widths of a plurality of individual layers of the wall.
Figure 4A:
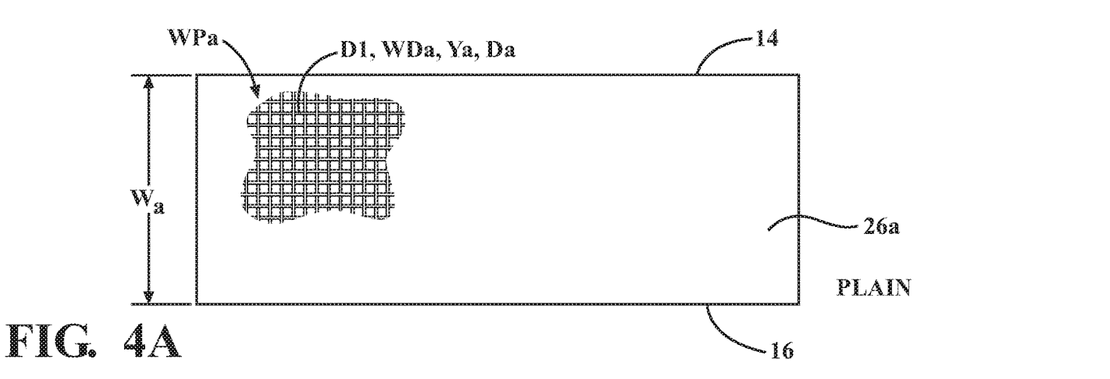
FIGS. 4A-4D illustrate schematic plan views of individual layers of the wall of FIG. 4.
Figure 4B:
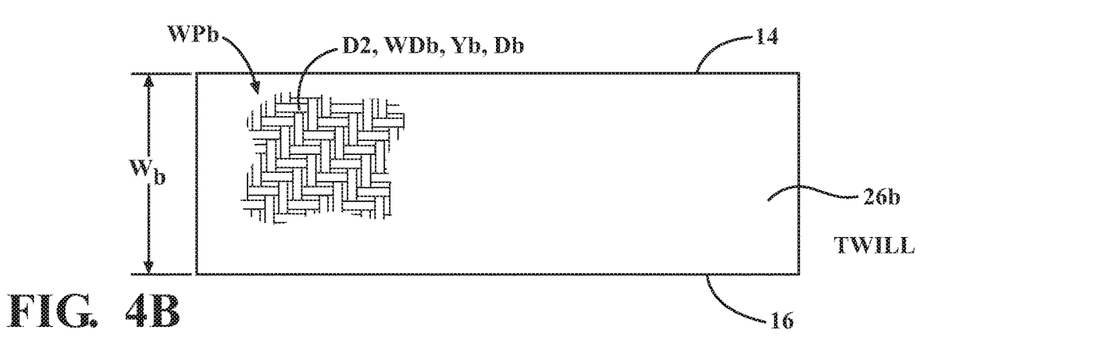
Figure 4C:
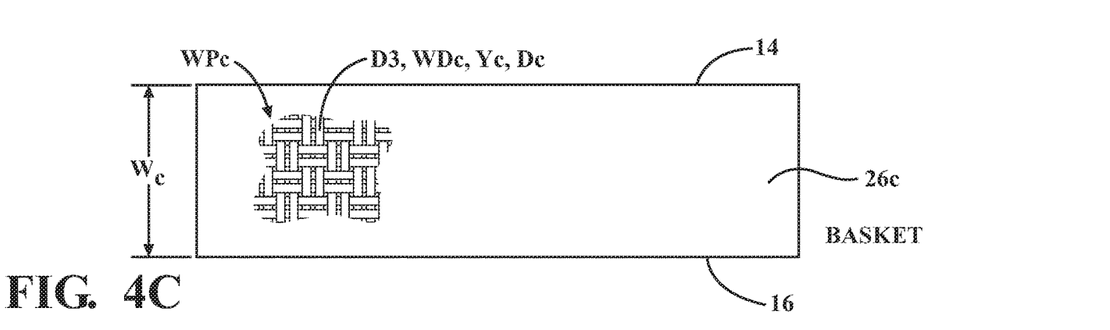
Figure 4D:
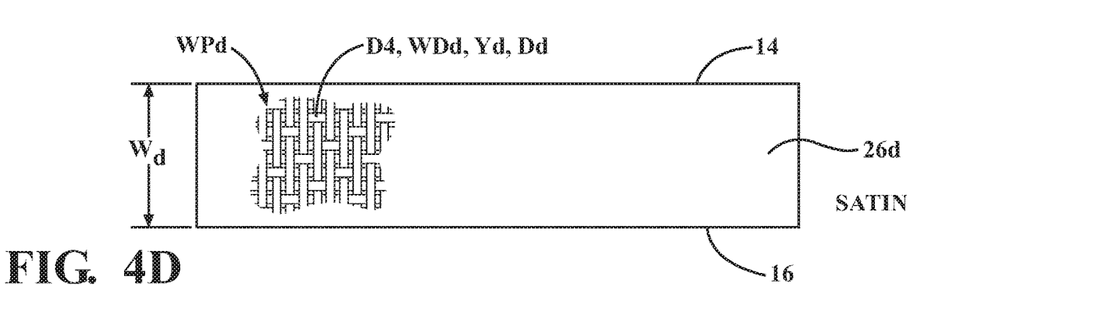

In accordance with an aspect of the disclosure, as illustrated in FIGS. 4 and 4A, the radially outermost layer 26a can be woven having a first width Wa extending between the opposite edges 14, 16 and the radially innermost layer 26d can be woven having a second width Wd (FIG. 4D) extending between the opposite edges 14, 16, with the first width Wa being greater than the second width Wd. As such, upon heat-setting the layers 26a, 26d, the innermost layer 26d is caused to take on a heat-set with without having wrinkles formed therein. It is to be recognized that the intermediate layers 26b, 26c sandwiched between the radially outermost layer 26a and the radially inner most layer 26d can be woven having respective widths Wb (FIG. 4B), Wc (FIG. 4C) decreasing in width relative to one another such that the widths Wa, Wb, Wc, Wd decrease relative to one another progressively from the radially outermost layer 26a to the radially innermost layer 26d. Accordingly, Wa>Wb>Wc>Wd. As a result, upon heat-setting the wall 12, each of the layers 26a, 26b, 26c, 26d remains smooth and free from wrinkles.

In accordance with an aspect of the disclosure, the radially outermost layer 26a can be woven having a first weave pattern WPa having a first weave tightness WDa and the radially innermost layer 26d can be woven having a second weave pattern WPd having a second weave tightness WDd, with the first weave tightness WDa being greater than the second weave tightness WDd. As such, upon heat-setting the layers 26a, 26d, the innermost layer 26d is caused to take on a heat-set with without having wrinkles formed therein. It is to be recognized that the intermediate layers 26b, 26c sandwiched between the radially outermost layer 26a and the radially inner most layer 26d can be woven having respective weave patterns WPb, WPc decreasing in weave tightness to one another such that the weave tightness WDa, WDb, WDc, WDd decreases relative to one another progressively from the radially outermost layer 26a to the radially innermost layer 26d. Accordingly, WDa>WDb>WDc>WDd. As a result, upon heat-setting the wall 12, each of the layers 26a, 26b, 26c, 26d remains smooth and free from wrinkles.

In accordance with an aspect of the disclosure, the outermost layer 26a can be woven with warp and/or weft yarn Ya having a first diameter (monofilament) and/or first denier (multifilament) Da and the innermost layer 26d can be woven with warp and weft yarn Yd having a second diameter and/or second denier Dd, with the first diameter and/or first denier Da being greater than the second diameter and/or second denier Dd, thereby resulting in the innermost layer 26d having a reduced density relative the outermost layer 26a, and thus, upon heat-setting the outermost and innermost layers 26a, 26d, the innermost layer 26d is caused to take on a heat-set without having wrinkles formed therein. For example, the outermost layer 26a can include warp yarn having a denier of about 1000 dtex, while the innermost layer can include warp yarn having a denier of about 750 dtex, by way of example and without limitation. It is to be recognized that the intermediate layers 26b, 26c sandwiched between the radially outermost layer 26a and the radially inner most layer 26d can be woven having respective warp and weft yarns Yb, Yc having diameters and/or deniers Db, Dc decreasing relative to one another such that the respective yarn diameters and/or deniers Da, Db, Dc, Dd decrease relative to one another progressively from the radially outermost layer 26a to the radially innermost layer 26d. Accordingly, Da>Db>Dc>Dd. Otherwise, the two outermost layers 26a, 26b could have warp yarns having a denier of about 1000 dtex, while the two innermost layers 26c, 26d could have warp yarns having a denier of about 75. As a result, the tightness of the innermost layers 26c, 26d is less than the tightness of the outermost layers 26a, 26b, and upon heat-setting the wall 12, each of the layers 26a, 26b, 26c, 26d remains smooth and free from wrinkles. It is to be further recognized that the respective warp yarns 28 of one or more of the layers 26a, 26b, 26c, 26d can be provided as multifilaments to provide softness and coverage, while the respective weft yarns 30 of one or more of the layers 26a, 26b, 26c, 26d can be provided as heat-set monofilaments to provide the self-wrapping function to automatically bias the opposite edges 14, 16 into overlapping relation with one another and to provide increased hoop strength and increased resistance to abrasion.

In accordance with an aspect of the disclosure, the outermost layer 26a can be woven with a first number of ends Ea and the innermost layer 26d can be woven with a second number of ends Ed, with the first number of ends Ea being greater than the second number of ends Ed, thereby resulting in the innermost layer 26d having a reduced density relative the outermost layer 26a, and thus, upon heat-setting the outermost and innermost layers 26a, 26d, the innermost layer 26d is caused to take on a heat-set without having wrinkles formed therein. It is to be recognized that the intermediate layers 26b, 26c sandwiched between the radially outermost layer 26a and the radially inner most layer 26d can be woven having respective numbers of ends Eb, Ec decreasing relative to one another such that the respective number of ends Ea, Eb, Ec, Ed decrease relative to one another progressively from the radially outermost layer 26a to the radially innermost layer 26d. Accordingly, Ea>Eb>Ec>Ed.

Figure 5A:
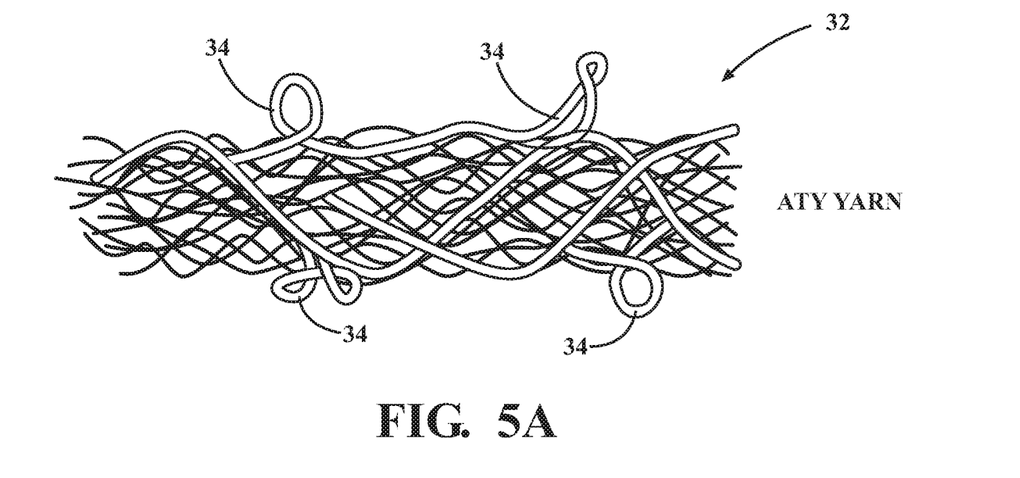
FIG. 5A is a fragmentary side view of a yarn used in the construction of a wall of a sleeve in accordance with one aspect of the disclosure.
Figure 5B:
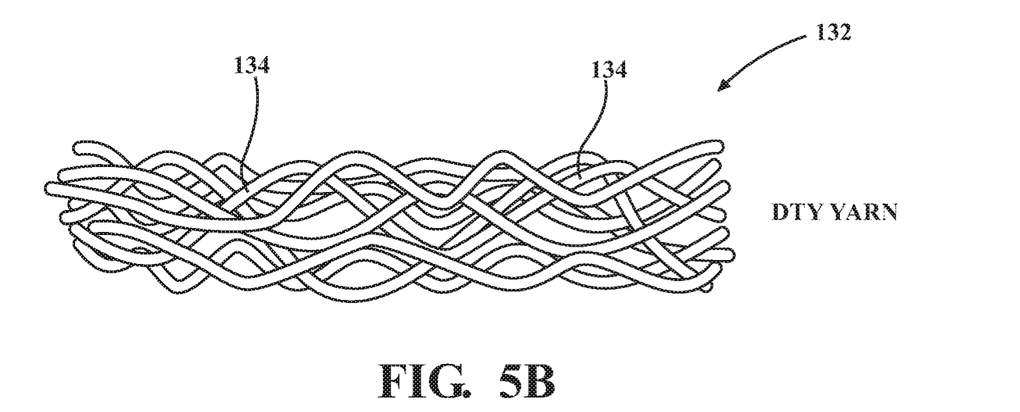
FIG. 5B is a fragmentary side view of a yarn used in the construction of a wall of a sleeve in accordance with another aspect of the disclosure.

In accordance with an aspect of the disclosure, the outermost layer 26a can be woven with a first number of texturized ends (TEa), in part or in entirety, and the innermost layer 26d can be woven with a second number of texturized ends (TEd), in part or in entirety, with the first number of texturized ends TEa being greater than the second number of ends TEd, thereby resulting in the innermost layer 26d having a reduced tightness relative the outermost layer 26a, and thus, upon heat-setting the outermost and innermost layers 26a, 26d, the innermost layer 26d is caused to take on a heat-set without having wrinkles formed therein. It is to be recognized that the intermediate layers 26b, 26c, if provided, sandwiched between the radially outermost layer 26a and the radially inner most layer 26d can be woven having respective numbers of texturized ends (TEb, TEc), in part or in entirety, decreasing relative to one another such that the respective number of ends TEa, TEb, TEc, TEd decrease relative to one another progressively from the radially outermost layer 26a to the radially innermost layer 26d. Accordingly, TEa>TEb>TEc>TEd. Further yet, the texturized ends TEa, TEb, TEc, TEd can be provided as air texturized yarn 32 having small loops 34 (ATY, FIG. 5A) and/or draw texturized yarn 132 having small loops 134 (DTY, FIG. 5B), wherein the loops 34, 134 provide energy absorption capacity to protect the elongate member 11 against damage from impact forces that may be experienced in a vehicle crash condition. It is to be recognized that the loops ATY and/or DTY can be provided in any one or more of the layers 26a, 26b, 26c, 26d desired, in part, whether provided as warp yarns 28 and/or fill yarns 30, or in entirety, to attain the desired impact resistance, while providing the wall 12 having the desired thickness and flexibility. The loops ATY and DTY within the one or more layers 26a, 26b, 26c, 26d can be provided of the same or different material type and having the same or different size (denier), depending on the type of protection desired.

In addition, within the aspects discussed above, the warp yarns 28 and/or fill yarns 30 can be provided as high tenacity yarns, such as from high tenacity polyethylene terephthalate (PET), para-aramid, liquid-crystal polymer, and the like. The high tenacity provides increased resistance to cut-through and absorbs an increased amount of impact energy without breaking, thereby provided optimal crash resistance and protection to the elongate member 11.

In accordance with an aspect of the disclosure, a method of constructing a wrappable, multilayered woven sleeve 10 is provided. The method includes weaving an elongate wall 12 having opposite edges 14, 16 extending lengthwise between opposite ends 18, 20, with the elongate wall 12 being configured to be wrapped about a central axis 22 to bring the opposite edges 14m 16 into overlapping relation with one another to bound a central cavity 24. Further, the method includes weaving the wall 12 to include a plurality of layers 26a, 26b, 26c, 26d extending in overlying relation with one another between the opposite ends 18, 20 and between the opposite edges 14, 16. The method further includes weaving each of the layers 26a, 26b, 26c, 26d including warp yarns 28 extending generally parallel to the central axis 22 being woven with fill yarns 30 extending generally transversely to the warp yarns 28, with one of the plurality of layers 26a being woven to form a radially outermost layer and one of the plurality of layers 26d being woven to form a radially innermost layer, wherein the radially outermost layer 26a is woven to have a first tightness D1 and the radially innermost layer 26d is woven to have a second tightness D2, with the first tightness D1 being greater than the second tightness D2. Then, upon weaving the wall 12, the method includes wrapping the opposite edges 14, 16 into overlapping relation with one another and heat-setting the wall 12 such that the wall 12 is formed to maintain the opposite edges 14, 16 in overlapping relation with one another, with some degree of shrinkage be contemplated within the yarns, such as greater than about 3% shrinkage during the heat-setting process. With the innermost layer 26d having a reduced tightness relative to the outermost layer 26a, the respective outermost and innermost layers 26a, 26d are able to remain free of wrinkles, thereby optimizing the protection to the elongate member 11 against impact forces and abrasion. Further, wherein the warp yarns 28 and/or fill yarns 30 shrink 3% or more, it is contemplated that the warp yarns 28 have a common degree of shrinking capacity with one another and that the fill yarns 30 have a common degree of shrinking capacity with one another to avoid the formation of wrinkles.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A wrappable, multilayered woven sleeve for routing and protecting elongate members, comprising:
an elongate wall having opposite edges extending lengthwise between opposite ends, said opposite edges being wrappable about a central axis into overlapping relation with one another to bound a central cavity, said wall having a plurality of layers extending between said opposite ends in overlying relation with one another, each of said layers including warp yarns extending generally parallel to the central axis woven with fill yarns extending generally transversely to said warp yarns, upon wrapping said opposite edges into overlapping relation with one another, one of said plurality of layers, forming a radially outermost layer, and one of said plurality of layers, forming a radially innermost layer, said radially outermost layer having a first tightness and said radially innermost layer having a second tightness, said first tightness being greater than said second tightness, wherein said radially outermost layer has an unwrapped first width extending between said opposite edges and said radially innermost layer has an unwrapped second width extending between said opposite edges, said first width being greater than said second width.

2. The wrappable, multilayered woven sleeve of claim 1, wherein said plurality of layers include intermediate layers sandwiched between said radially outermost layer and said radially inner most layer, said intermediate layers having respective unwrapped widths decreasing in width relative to one another such that the unwrapped widths decrease relative to one another progressively from the radially outermost layer to the radially innermost layer.

3. The wrappable, multilayered woven sleeve of claim 1, wherein said radially outermost layer has a first weave pattern and said radially innermost layer has a second weave pattern, said first weave pattern being different from said second weave pattern.

4. The wrappable, multilayered woven sleeve of claim 3, wherein said first weave pattern is a plain weave and said second weave pattern is other than a plain weave pattern.

5. The wrappable, multilayered woven sleeve of claim 3, wherein said second weave pattern is one of a twill weave, satin weave, or basket weave.

6. The wrappable, multilayered woven sleeve of claim 1, wherein said outermost layer is woven with yarn having a first diameter and/or first denier and said innermost layer is woven with yarn having a second diameter and/or second denier, said first diameter and/or first denier being greater than said second diameter and/or second denier.

7. The wrappable, multilayered woven sleeve of claim 1, wherein said outermost layer has a first number of ends and said innermost layer has a second number of ends, said first number of ends being greater than said second number of ends.

8. The wrappable, multilayered woven sleeve of claim 1, wherein at least one of said outermost layer and said innermost layer is woven with texturized warp yarn and/or texturized fill yarn.

9. The wrappable, multilayered woven sleeve of claim 1, wherein at least one of said outermost layer and said innermost layer is woven with heat-shrinkable warp yarn and/or heat-shrinkable fill yarn, wherein said heat-shrinkable warp yarn and said heat-shrinkable fill yarn shrinks 3% or more in length.

10. A wrappable, multilayered woven sleeve for routing and protecting elongate members, comprising:
an elongate wall having opposite edges extending lengthwise between opposite ends, said opposite edges being wrappable about a central axis into overlapping relation with one another to bound a central cavity, said wall having a plurality of layers extending between said opposite ends in overlying relation with one another, each of said layers including warp yarns extending generally parallel to the central axis woven with fill yarns extending generally transversely to said warp yarns, upon wrapping said opposite edges into overlapping relation with one another, one of said plurality of layers, forming a radially outermost layer, and one of said plurality of layers, forming a radially innermost layer, said radially outermost layer has an unwrapped first width extending between said opposite edges and said radially innermost layer has an unwrapped second width extending between said opposite edges, said unwrapped first width being greater than said unwrapped second width.

11. The wrappable, multilayered woven sleeve of claim 10, wherein said plurality of layers include intermediate layers sandwiched between said radially outermost layer and said radially inner most layer, said intermediate layers having respective unwrapped widths decreasing in width relative to one another such that the unwrapped widths decrease relative to one another progressively from the radially outermost layer to the radially innermost layer.

12. The wrappable, multilayered woven sleeve of claim 10, wherein said radially outermost layer has a first weave pattern and said radially innermost layer has a second weave pattern, said first weave pattern being different from said second weave pattern.

13. The wrappable, multilayered woven sleeve of claim 12, wherein said first weave pattern is a plain weave and said second weave pattern is other than a plain weave pattern.

14. The wrappable, multilayered woven sleeve of claim 13, wherein said second weave pattern is one of a twill weave, satin weave, or basket weave.

15. The wrappable, multilayered woven sleeve of claim 10, wherein said outermost layer is woven with yarn having a first diameter and/or first denier and said innermost layer is woven with yarn having a second diameter and/or second denier, said first diameter and/or first denier being greater than said second diameter and/or second denier.

16. A method of constructing a wrappable, multilayered woven sleeve, comprising:
weaving an elongate wall having opposite edges extending lengthwise between opposite ends, said elongate wall being configured to be wrapped about a central axis to bring said opposite edges into overlapping relation with one another to bound a central cavity, weaving said wall to include a plurality of layers extending in overlying relation with one another between said opposite edges and between said opposite ends, with each of said layers including warp yarns extending generally parallel to the central axis woven with fill yarns extending generally transversely to said warp yarns, weaving one of said plurality of layers to form a radially outermost layer and weaving one of said plurality of layers to form a radially innermost layer upon wrapping the opposite edges into overlapping relation with one another, weaving said radially outermost layer having a first tightness and weaving said radially innermost layer having a second tightness, said first weave tightness being greater than said second weave tightness, and weaving said radially outermost layer having an unwrapped first width extending between said opposite edges and weaving said radially innermost layer having an unwrapped second width extending between said opposite edges, said unwrapped first width being greater than said unwrapped second width.

17. The method of claim 16, further including weaving said plurality of layers including intermediate layers sandwiched between said radially outermost layer and said radially inner most layer, and weaving said intermediate layers having respective unwrapped widths decreasing in width relative to one another such that the unwrapped widths decrease relative to one another progressively from the radially outermost layer to the radially innermost layer.

18. The method of claim 16, further including weaving said outermost layer with yarn having a first diameter and/or first denier and weaving said innermost layer with yarn having a second diameter and/or second denier, said first diameter and/or first denier being greater than said second diameter and/or second denier.

* * * * *